United States Patent
Carlsson et al.

(10) Patent No.: US 6,253,074 B1
(45) Date of Patent: Jun. 26, 2001

(54) CELLULAR TELECOMMUNICATIONS SYSTEMS HAVING SELECTIVELY ASSOCIATABLE USAGE PARAMETERS

(75) Inventors: Karl Ove Roger Carlsson; John Christer Axelsson; Inger Marianne Andersson, all of Linköping; Magnus Lindgren, Linköpin, all of (SE); Sve Gunnar Ivar Thrysin, Guilford Sorrey (GB)

(73) Assignee: Telefonaktiebolaget L/M Ericsson (publ), Stockholm (SE)

( * ) Notice: Subject to any disclaimer, the term of this patent is extended or adjusted under 35 U.S.C. 154(b) by 0 days.

(21) Appl. No.: 08/585,149

(22) Filed: Jan. 10, 1996

(51) Int. Cl.$^7$ .................................................. H04Q 7/22
(52) U.S. Cl. ........................... 455/414; 455/406; 455/422
(58) Field of Search ..................... 455/403, 422, 455/432, 433, 435, 445, 414, 406, 461, 550, 567, 408

(56) References Cited

U.S. PATENT DOCUMENTS

| | | |
|---|---|---|
| 4,593,155 | 6/1986 | Hawkins ............................ 179/2 EA |
| 4,734,928 | 3/1988 | Weiner et al. ......................... 379/59 |
| 4,742,560 | 5/1988 | Arai ....................................... 455/33 |
| 5,029,233 | 7/1991 | Metroka ................................ 455/11 |
| 5,101,500 | 3/1992 | Marui .................................... 455/33 |
| 5,138,648 | 8/1992 | Palomeque et al. ................... 379/22 |
| 5,153,906 | 10/1992 | Akiyama .............................. 379/112 |
| 5,249,302 | 9/1993 | Metroka et al. ..................... 455/11.1 |
| 5,251,248 | * 10/1993 | Tokunaga et al. .................... 455/461 |
| 5,259,018 | 11/1993 | Grimmett et al. ...................... 379/58 |
| 5,287,403 | 2/1994 | Atkins et al. ......................... 379/144 |
| 5,301,223 | 4/1994 | Amadon et al. ........................ 379/58 |
| 5,329,578 | * 7/1994 | Brennan et al. ...................... 455/461 |
| 5,371,781 | * 12/1994 | Ardon ................................... 455/445 |
| 5,437,053 | 7/1995 | Sawa et al. .......................... 455/33.1 |
| 5,438,615 | 8/1995 | Moen .................................... 379/144 |
| 5,440,614 | * 8/1995 | Sonberg et al. ...................... 455/414 |
| 5,504,804 | * 4/1996 | Widmark et al. ..................... 455/461 |
| 5,583,917 | * 12/1996 | Jonsson ................................ 455/461 |

FOREIGN PATENT DOCUMENTS

| | | |
|---|---|---|
| 0 047 524 A1 | 9/1981 | (EP) . |
| 0 048 868 A1 | 9/1981 | (EP) . |
| 0 433 465 A1 | 6/1990 | (EP) . |

OTHER PUBLICATIONS

Bick Truet, *CT2 casts cloud over U.S. pay phone market*, Jul. 9, 1990, Telephony, p. 34.

*Personal Mobility in PCS–Removing the Fixed Association Between Terminal and User* by Mohammed Zaid 8439 IEEE Personal Communications 1 (1994) 4th Quarter, No. 4, New York, NY, US.

*User Profile Identification in Future Mobile Telecommunications Systems* by G.P. Eleftheriadis and M.E. Theologou IEEE Network, Sep./Oct. 1994.

* cited by examiner

Primary Examiner—Dwayne D. Bost
Assistant Examiner—William G. Trost
(74) Attorney, Agent, or Firm—Jenkens & Gilchrist, P.C.

(57) ABSTRACT

A telecommunication system is architecturally sub-divided into the concepts of user, subscription and terminal. A database within a cellular radio telecommunication system is provided with separate and independent storage registers for storing information relating to each of user, subscription and terminal. An user register is provided for user information, a terminal register is provided for terminal information and a subscription register is provided for subscription information. The use of three separate registers within the system allow several terminals to be associated with one user, several users to be associated with one terminal, several subscriptions to be associated with one user, and several users to be selectively associated with one subscription.

9 Claims, 12 Drawing Sheets

CELLULAR TELECOMMUNICATIONS SYSTEMS HAVING SELECTIVELY ASSOCIATABLE USAGE PARAMETERS

BACKGROUND OF THE INVENTION

1. Technical Field of the Invention

The present invention relates to a cellular telecommunications system and, in particular, a system for enabling telecommunication services for multiple subscribers utilizing multiple terminals and for charging the generated fees to a plurality of separate subscriptions.

2. Description of Related Art

Developments and improvements in wireless telecommunications switching systems have allowed wireless subscribers to easily move from one physical location to another and still access and utilize the subscribers' own telephone services and subscriber features. For examples an inherent feature of a cellular radio system is that an owner of a cellular telephone subscriber station can move freely within his or her home exchange area and receive or make calls without being connected to a communication line by wires. An enhancement of conventional cellular systems is the interconnection of several different systems into a cellular network which allows "roaming." Roaming permits a wireless user to move from one city covered by a first cellular system to another city covered by a second cellular system and still use his or her same cellular subscriber station.

However, even though the above mentioned cellular system services and subscriber features provide some form of user mobility within telecommunications systems, they do not provide true subscriber, terminal, or subscription mobility. For example, current cellular subscriber terminals are each identified with a specific user having a specific account associated with his or her subscription to the services of the cellular operator. Consequently, when a call is made within a conventional cellular radio network, it is always from one subscriber terminal to another subscriber terminal because each directory number within a cellular system is assigned to a particular mobile identification number (MIN), and thus, to a particular subscriber terminal and not to a particular user. All calls made from that particular cellular subscriber terminal are charged to a single fixed subscription account preassigned by the operator to that terminal. Moreover, unless a visiting user who has access to a "new"subscriber terminal notifies his or her potential callers of the number assigned to that "new" terminal, no one other than the user previously assigned to that particular terminal may receive an incoming call on it.

With conventional cellular systems, each cellular subscriber is directly associated with a particular cellular terminal and must physically carry that cellular terminal wherever he or she goes in order to receive and make telephone calls within the system. Furthermore, all calls originated or terminated from that particular subscriber's terminal are charged to one particular pre-assigned subscription. Accordingly, there is no true mobility or independency between a cellular system subscription, a cellular subscriber terminal and a cellular user.

Therefore, it would be a desirable capability for cellular telecommunications networks to flexibly accommodate multiple possible users on a single subscriber terminal, multiple possible subscriber terminals by a single user, multiple distinguishable users by a single cellular system subscription, and the use of multiple cellular subscriptions by a single user in order to provide true user, terminal and subscription mobility.

Cellular telephone terminals are widely available worldwide and, thus, there is no real need for a user to be physically dependent on a particular cellular subscriber terminal in order to utilize his or her cellular subscriber services. It would be a distinct advantage for a cellular user to be able to pick up any available cellular subscriber terminal and receive and originate telephone calls based upon his or her own cellular system subscription. The system of the present invention enables a user to select any available cellular subscriber terminal to make an outgoing call and have it charged to his own "virtual" subscription. As a user travels around the cellular networks without his cellular subscriber terminal, he may freely register with any available cellular telephone terminal and, from the time of that registration, receive all of his incoming calls at that newly registered subscriber terminal. Furthermore, several users can register with the system and associate each of themselves with a single cellular subscriber terminal and thereby allow several users to share one subscriber terminal when only one terminal is available (e.g., four people car pooling with only one cellular terminal in the car). A display panel in the cellular terminal displays the particular number or party for whom an incoming call is intended and informs the assigned user to answer the incoming call.

Currently, a cellular subscriber terminal owner pays for all incoming and outgoing calls connected through that terminal regardless of the particular individual using the terminal. The present invention enables incoming calls to a particular cellular subscriber terminal to be charged to the subscription account assigned to the called party and not simply to that of the terminal owner. Similarly, outgoing calls are charged to a visiting user's own subscription account instead of automatically being charging to that of the terminal owner.

SUMMARY OF THE INVENTION

With conventional cellular systems, each cellular subscriber is directly associated with a particular cellular terminal. Accordingly, there is no true mobility or independency between a cellular system subscription, a cellular subscriber terminal and a cellular user.

The present invention advantageously provides true user, terminal and subscription mobility within a cellular system by assigning a telephone number to a particular user rather than to a particular subscriber terminal. Subscriptions and subscriber terminals are each identified by separate unique identifications numbers. Accordingly, the present invention discloses a system which allows several users to register with the cellular system and thereby all utilize a single terminal for receiving terminating calls. A user may also utilize someone else's cellular telecommunications terminal to make an outgoing call and have it charged to his own subscription regardless of who the subscriber terminal belongs to. The present invention enables a cellular system operator to assign more than one user to a single subscription account. For example, a family can have one subscription with multiple different users utilizing multiple different cellular subscriber terminals. All service charges incurred by those users are charged to the single subscription.

In one aspect, the present invention includes a system wherein a home location register (HLR) comprises separate registers or storage means for separately storing user, terminal and subscription information.

In another aspect, the present invention includes a method and apparatus for providing a cellular telecommunications service for users wherein multiple terminals may be associated with a single user for terminating calls; multiple users may be associated with a single terminal for the receipt of terminating calls; multiple users may be associated with a single subscription; multiple subscriptions may be associated with a single user; and a user may register as the originating caller on any subscriber terminal and have the cost charged to his particular account In still another aspect, the present invention provides a method and apparatus for enabling user, subscription and terminal mobility by providing means for more than one subscriber terminal identification to be stored in a user register; more than one user identification to be stored in a terminal register; more than one subscription identification to be stored in a user register; and more than one user identification to be stored in a subscription register.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF A PRESENTLY PREFERRED EXEMPLARY EMBODIMENT

Figure 1:
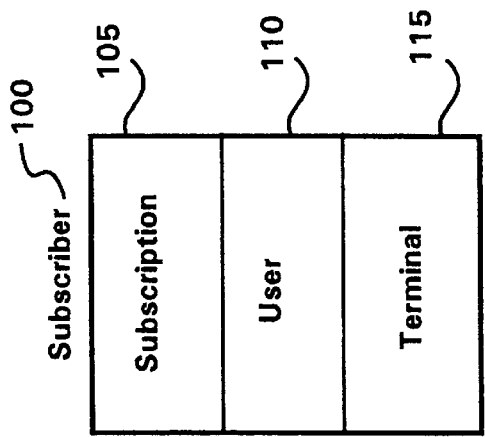
FIG. 1 is a diagram illustrating the direct association between subscriptions, users and terminals in a conventional cellular system with a single register or storage means representing all three elements.

FIG. 1 is a diagram illustrating the dependency that exists in current cellular radio systems between a cellular system subscription 105, a cellular system subscriber or user 110, and a cellular subscriber station or terminal 115. Because of such one-to-one mapping, there is only one register or storage means associated with and representing all three elements. Accordingly, in previous systems, a telephone number is inherently and directly associated with a particular cellular subscriber terminal, and in turn, also directly associated with a single subscription that is responsible for the charges incurred within the system from that particular subscriber station. Cellular system operators commonly refer to the above three elements collectively as a "subscriber." However, there are clear disadvantages to having only one register or storage means representing all of the above three elements collectively as a subscriber. Such disadvantages are:

1) Only one user can be associated with one subscription This means that a new subscription has to be defined for every new user, and therefore that every user must have his own bill. It also means that a user cannot select a particular subscription account to be charged for a particular call. Accordingly, the subscriber responsible for each physical terminal will always pay all charges incurred on that number;
2) A user cannot be registered on more than one terminal for the receipt of terminating calls. This means that a particular telephone number always represents a certain physical terminal rather than a particular user; and
3) Only one user can register on a particular terminal. This impediment implies that only one user can have his calls delivered to that particular terminal unless calls are first forwarded from a different number.

The present invention overcomes these disadvantages by defining a clear distinction between each user 110, each subscriber terminal 115, and each subscription 105 in accordance with the teachings of the present invention.

As used herein, the term "user" refers to a person who uses telephone services within a cellular telecommunications network. A typical telephone user may use more than one cellular subscriber terminal, and may wish to charge his calls to more than one subscription account. For example, calls made for the user's private purposes may be charged to the user's private subscription while, on the other hand, calls made for the user's business purposes may be charged to the user's employer's subscription The term "terminal" as used herein refers to a cellular subscriber station or mobile terminal equipment from which a call can be made or received within a cellular radio system. More than one user may wish to use a particular terminal and charge the resulting costs to the user's own subscription regardless of who the particular physical terminal belongs to. Also, a single user may wish to have more than one terminal assigned to him Lastly, the term "subscription" as used herein refers to an agreement between a cellular telephone operator and a person. A user may wish to have more than one subscription without having more than one terminal, e.g. for personal or business uses. On the other hand, a user may wish to have only one subscription account while having or using multiple terminals.

Accordingly, there is a logical and conceptual distinction that exists between the above three elements. By separating the conventional association between the above three elements, the present invention discloses a system where:

multiple users can be registered and thereby associated with a single terminal;

multiple terminals can be assigned to a single user;

multiple subscriptions can be assigned to a single user; and multiple users can be assigned to a single subscription.

Figure 2:
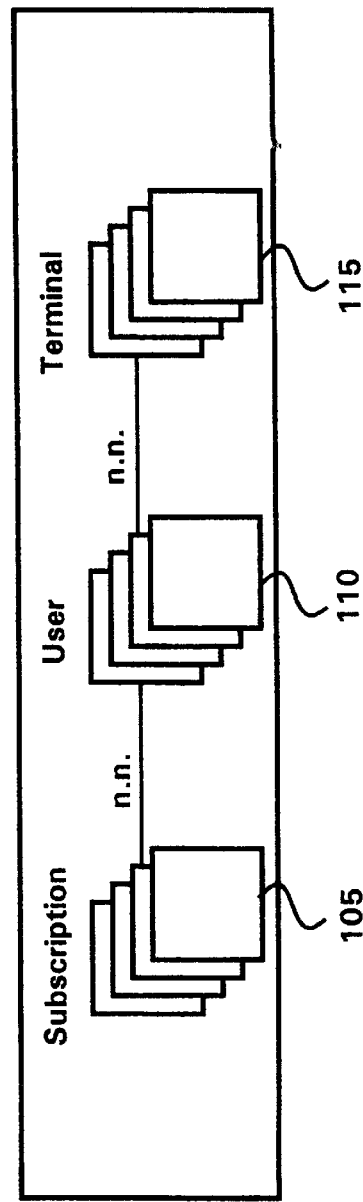
FIG. 2 is a diagram illustrating the independency between subscriptions, users and terminals achieved by maintaining separate records for each of the three elements in accordance with the teachings of the present invention.

FIG. 2 is a diagram illustrating the independency between subscriptions, users and terminals achieved by maintaining separate records for each one of the three elements in accordance with the teachings of the present invention. Accordingly; the subscription records 105 store information regarding agreements between users and cellular system operators on the usage of telecommunications services within a telecommunications network. The user records 110 store information regarding persons who have access to telecommunications services within a cellular system. Lastly, the terminal records 115 store information regarding particular cellular subscriber stations or terminals that are connected to a telecommunications network. Therefore, the terminal records 115 no longer store information regarding subscription or user information. Those data are separately stored in the subscription records 105 and the user records 110. Consequently, because of the fact that there is no interconnection or distinct association between the above three elements, the number of registers or storage means for each one of the above three records does not have to be the same. A single user can be assigned multiple subscriptions and/or multiple terminals.

Figure 3:
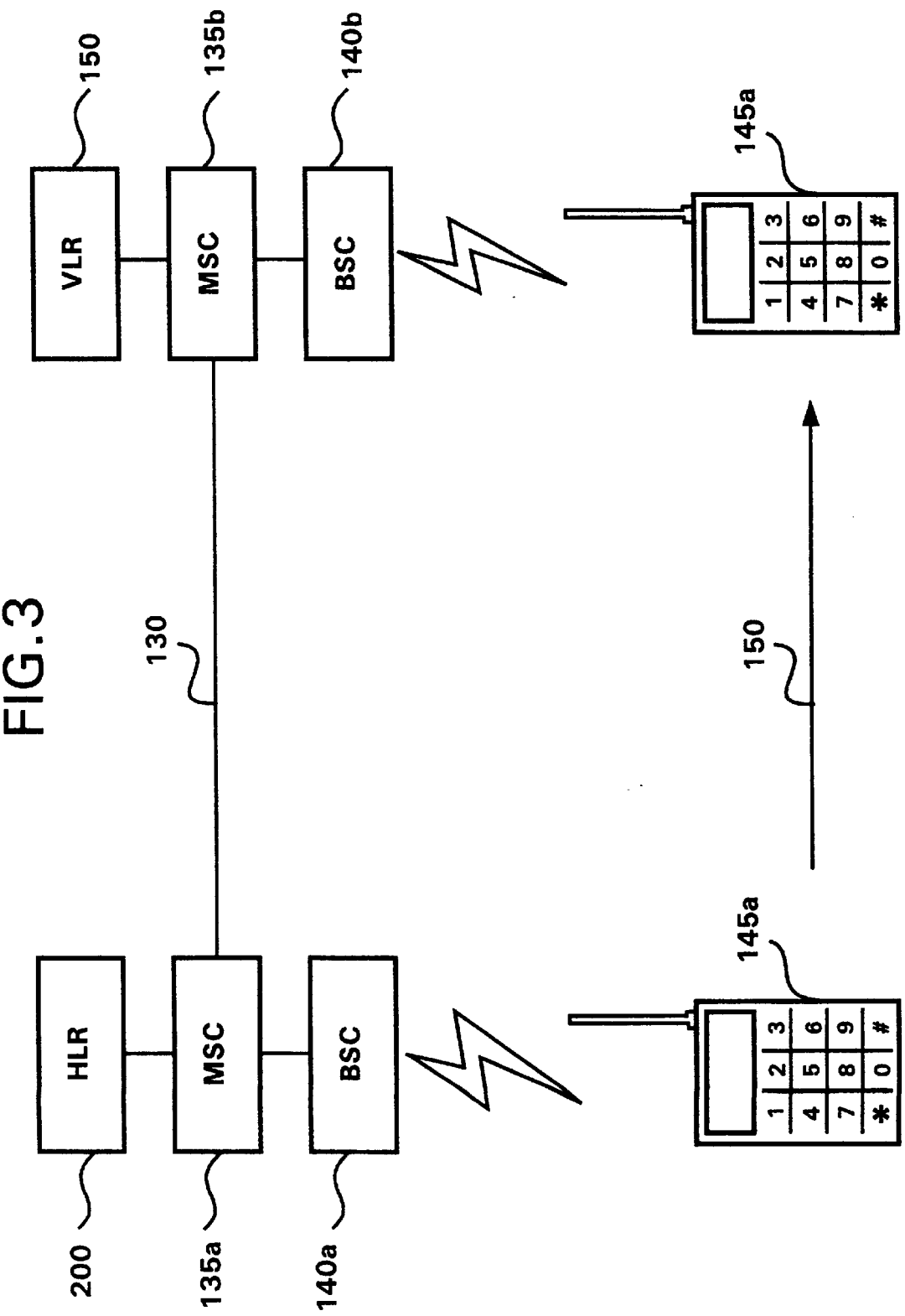
FIG. 3 is a diagram representing two mobile stations interconnected through a cellular radio system to provide telecommunications services therebetween.

FIG. 3 is a diagram representing two mobile stations interconnected to provide telecommunications services to cellular telephone users in which the present invention, as will be disclosed herein, may be implemented. A cellular telecommunications network link comprises a mobile service switching center (MSC) 135, a home location register (HLR) 200, a visitor location register (VLR) 150, a base station controller (BSC) 140, and a cellular telephone terminal 145. The HLR 200 is a database containing information about all users, terminals and their services and locations serviced by the MSC 135. In large network networks with high subscriber densities, the HLR 200 is a separate node as shown in FIG. 1. In small networks, it can be integrated into the MSC 135.

The BSC 140a provides the communication link with a cellular telephone terminal 145a when the terminal is within one of the BSC's 140a coverage area known as a cell. The MSC 135a, labeled as the "home MSC", is located within a first cellular system and handles the cellular telephone terminal's 145a information. If the subscriber crosses the border to another cellular system serviced by another MSC during a conversation, an interexchange handoff will take place and the adjacent MSC 135b, known as a "visited MSC," then handles the conversation. The process of allowing a mobile station which has an account with a first cellular system to travel into a second cellular system and receive services from that second system for incoming and outgoing calls is known as "roaming." As the cellular telephone terminal 145a moves to another cellular system and tries to use its telecommunications services, as represented by the line 150 in FIG. 3, the visited MSC 135b notifies the home HLR 200 of the mobile station's presence in its area and requests confirmation data related to the station's account with that system via the communication link 130. If the request to provide telecommunications services is approved by the HLR 200, the visited MSC 135b provides the telecommunications service to the visiting cellular telephone terminal 145a as a roaming subscriber. The visited MSC 135b also copies the needed subscriber information from the HLR 200 and stores it at the visitor location register (VLR) 150. Such copying reduces the need for the MSC 135b to communicate with the HLR 200 every time it needs additional data from the home switch. Currently, in the HLR 200, one register or equivalent storage means stores user, terminal and subscription information all in a single directly associated location. Because of this one-to-one mapping, users or current systems are not independent from their terminals and subscriptions.

Figure 4:
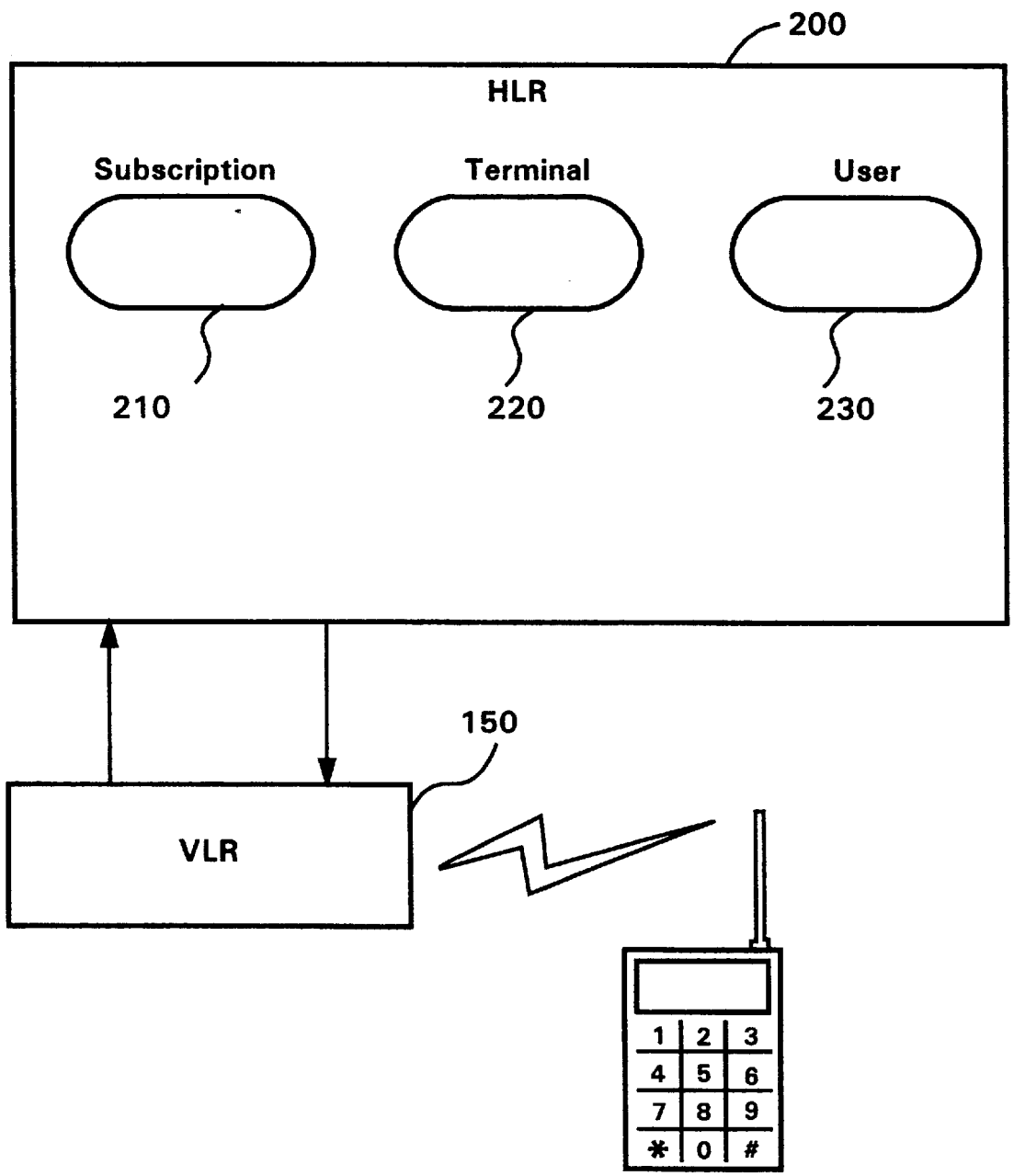
FIG. 4 is a logical diagram representing a visiting location register (VLR) communicating with a home location register (HLR) which comprises a several subscription register, terminal register, and user register in accordance with the teachings of the present invention.

Accordingly, FIG. 4 is a diagram illustrating a HLR comprising three separate types of registers for storing, respectively, subscription, terminal and user information each separate and independent from the other. When the VLR 150 providing service to a roaming subscriber communicates with the HLR 200 of that subscriber, it no longer retrieves data from a single record. Rather, the system of the VLR 150 of the present invention retrieves information about each subscription from a subscription register 210, about each terminal from a terminal register 220, and information about each user from a user register 230 independently of one another. For simplicity, all three elements are shown in FIG. 4 as being assigned to the same home MSC/HLR. The system of the present invention enables a user assigned to one HLR to access and use a terminal or subscription assigned to and associated with a different HLR. Therefore, if a user wishes to use a subscriber terminal that is currently assigned to a different home MSC/HLR, then the user's home MSC/HLR must communicate with the terminal's MSC/HLR in order to provide the VLR 150 with all the necessary information to allow telecommunications services to the requesting roaming subscriber.

Figure 5:
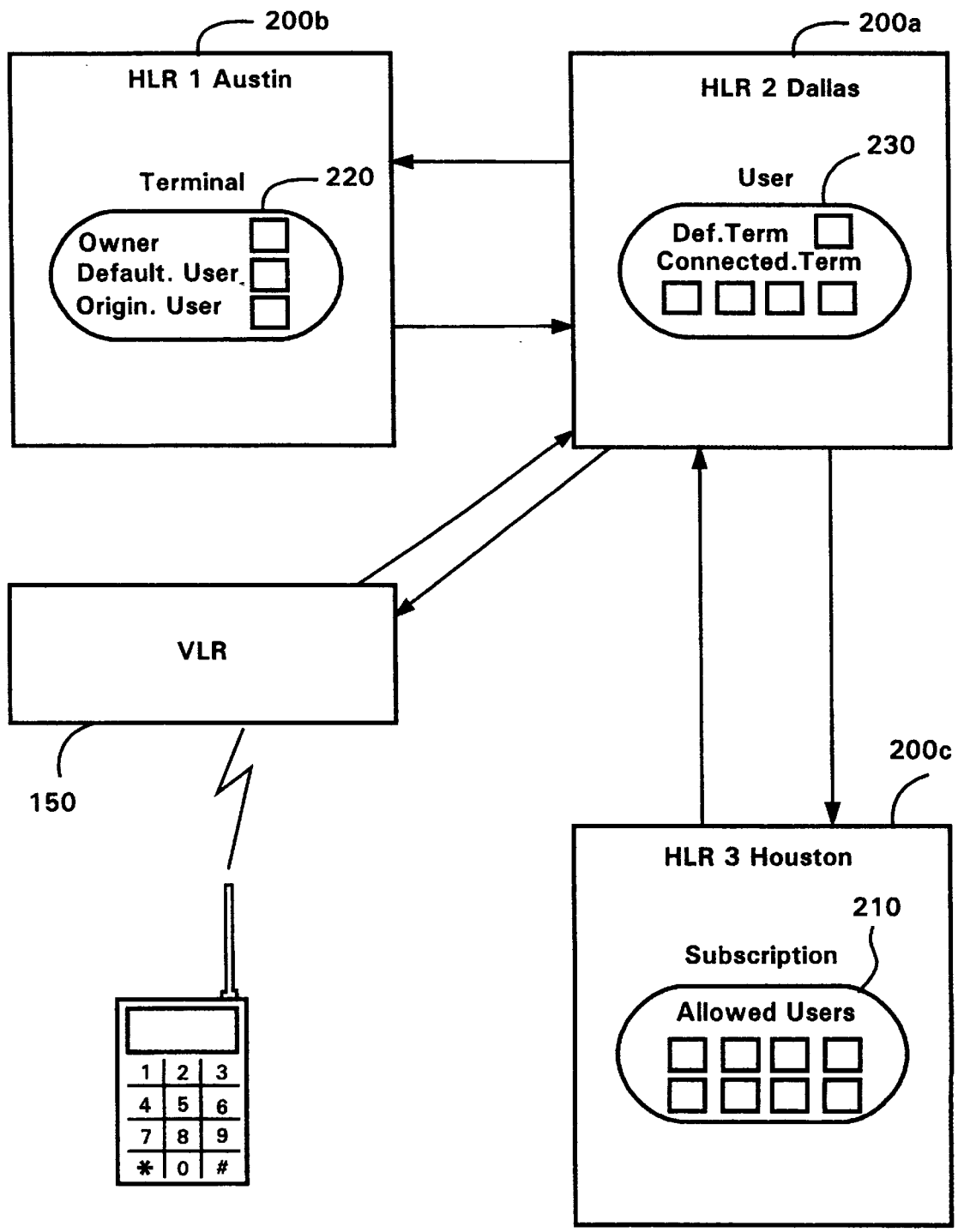
FIG. 5 is a logical diagram representing a visiting location register (VLR) communicating with a number of different home location registers (HLRs) wherein separate terminal register, user register, and subscription register are each located in different HLRs in accordance with the teachings of the present invention.

Accordingly FIG. 5 is a diagram representing a VLR communicating with a number of different HLRs where the terminal register 220, user register 230 and subscription register 210 are all separately located in different HLRs in accordance with the teachings of the present invention. As an example, FIG. 5 shows a user assigned to the Dallas HLR 200a moving to a different cellular system area and trying to use a terminal assigned to the Austin HLR 200b while charging the calls to his company subscription assigned to the Houston HLR 200c. For such a case, the VLR 150 communicates with the HLR 200a containing the user register 230. The HLR 200a in turn communicates with the HLR 200b containing the terminal register 220 and the HLR 200c containing the subscription register 210. However, for simplicity, only a signal sequence dealing with an HLR containing all three types of registers are described in detail.

Figure 6:
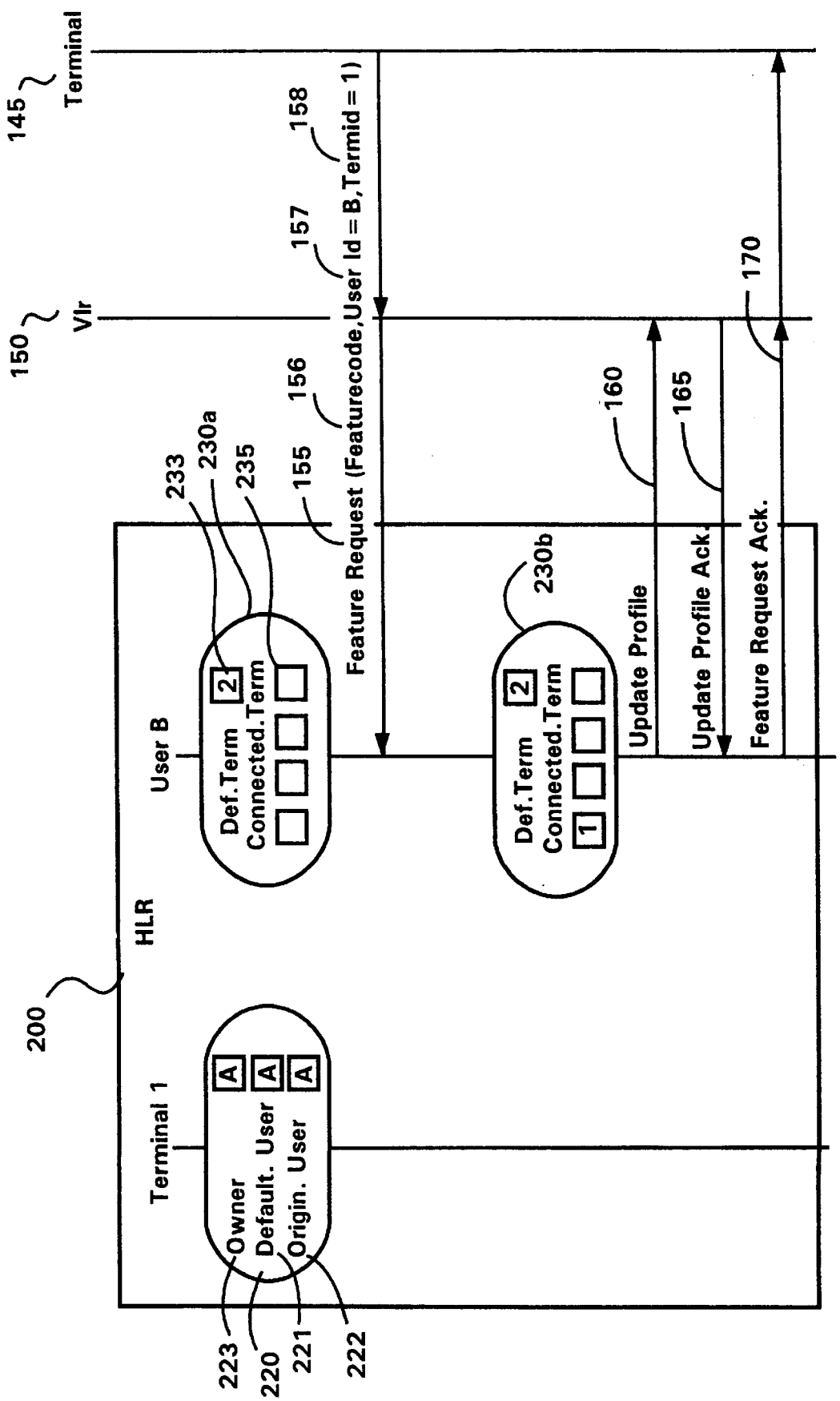
FIG. 6 is a signal-sequence diagram illustrating a cellular subscriber being connected to a new subscriber terminal to enable the receipt of future terminating calls in accordance with the teachings of the present invention.

FIG. 6 is a signal-sequence diagram illustrating a user being connected to a new subscriber terminal to enable the receipt of future terminating calls in accordance with the teachings of the present invention. Each register within the HLR contains several variables to allow multiple and separate assignments of the three elements (subscription, terminal, user) as described above. The user register 230 contains two types of variables: the default terminal variable 233 for storing the identification number of a terminal used by the assigned user as the default terminal; and the connected terminal variable 235 for storing the identification number (MIN) of each of the terminals which the user may employ.

The terminal register 220 contains three types of variables. The owner variable 223 which stores information reflecting the identification of the owner of the represented terminal. Therefore, the owner is the user that is registered as the owner of the represented terminal. The default user variable 221 which stores the identification of the default user. Therefore, the default user variable 221 contains the user identity for the user that shall be copied to the originating user variable 222 after the represented terminal has been turned off or after a connection as "originating user for just one call" has been finished. Lastly, the originating user variable 222 which stores the identification of each user who may initiate originating calls from this terminal. Therefore, the originating user is the user currently registered as current user for outgoing calls. Furthermore, subscriber feature services and profiles for the originating user are utilized during call setup.

According to FIG. 6, before the receipt of any signals, the terminal-1-register within the HLR 200 reflects user A as the owner, default user and original user for terminal 1. The user-B-register 230a reflects terminal 2 as the default terminal for user B, and shows that no other terminals are connected as connected terminals. When user B wishes to use terminal 1 as a new terminal, the user must register with the HLR 200 by entering his personal access code. Terminal 1 145 sends a signal featurerequest 155 to its servicing MSC. The VLR 150 within terminal is servicing MSC sends the same signal featurerequest 155 to the HLR 200 housing the user B's register. There are a number of parameters which provide the HLR 200 with the necessary information to process the request. The featurecode parameter 156 informs the HLR 200 as to which type of transaction it is requesting. The UserId parameter 157 informs the HLR 200 as to which user is requesting the charge. The TermID parameter 158 informs the HLR 200 as to which particular terminal is being used by the above user initializing the requests. For example; the above featurerequest signal 155 is requesting the HLR 200 to assign terminal 1 as a new connected terminal in the user-B-register 233. Because of the fact that user B only wishes to connect to terminal 1 for future terminating calls, there is no need to update the terminal-1-register within the HLR 200. The terminal-1-register-variable is updated only when a user wishes to be assigned as the originating user for that particular terminal. As shown in the user-B-register 230b, after the processing of the featurerequest signal, the connected-term-variable stores the value 1 to reflect that the user B is now connected to terminal 1.

After registration has been completed, the update-profile-signal 160 is transmitted to the VLR 150 to update the contents of the VLR's registers with the HLR's 200 user-B-register values. Such updating is necessary in order to avoid having the VLR 150 repeatedly communicate with the HLR 200 to access other necessary information during the processing of a call. Once the updating has been completed by the VLR 150, it acknowledges the copying by returning the update-profile-ack signal 165. The HLR 200, in turn, returns the feature-request-ack-signal 170 to inform the VLR 150 and terminal 1 of the completion of the initial request. From this point on, all incoming calls to user B will terminate to the newly registered terminal 1 in accordance with the teachings of the present invention.

Figure 7:
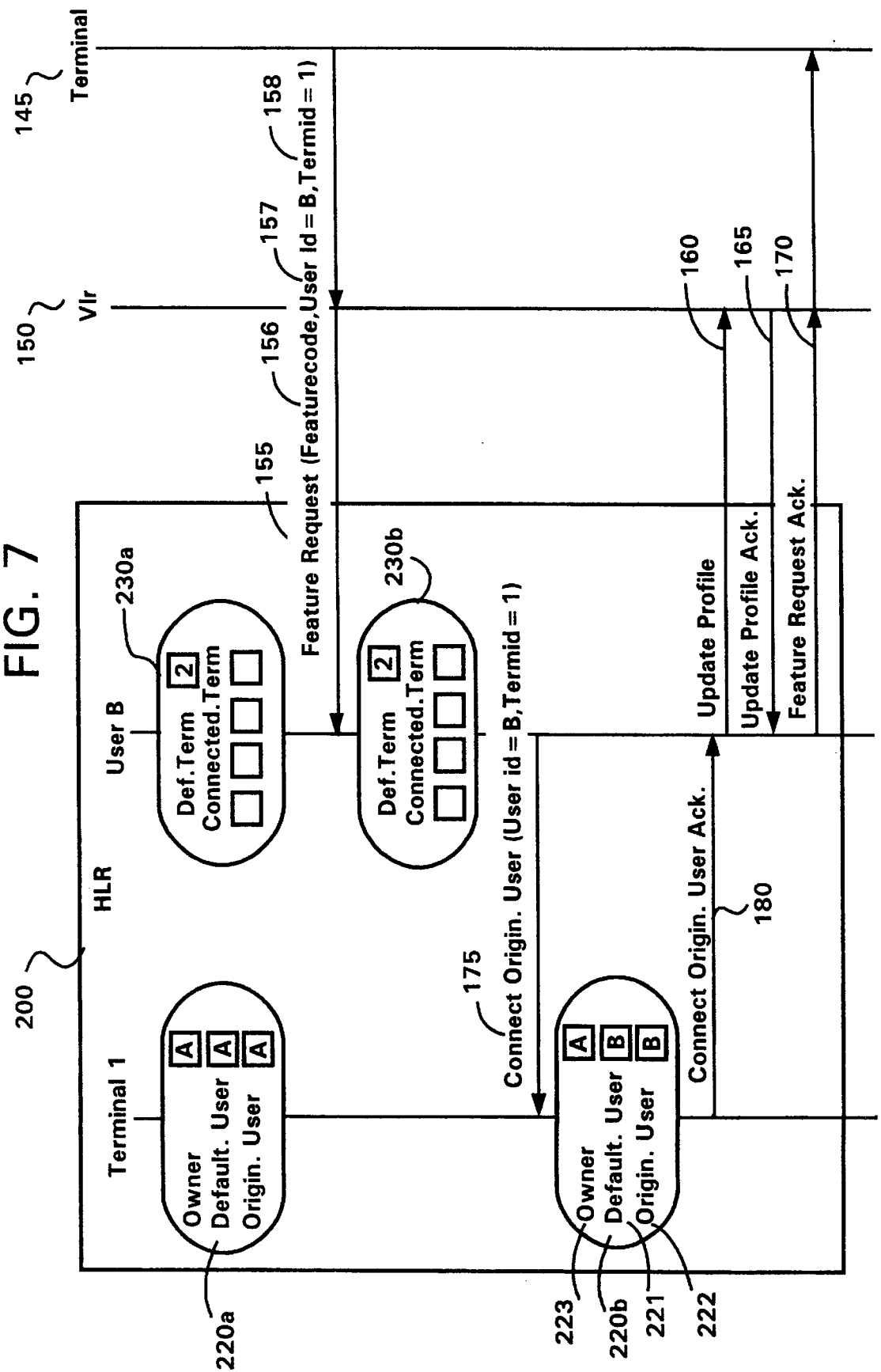
FIG. 7 is a signal-sequence diagram illustrating a cellular subscriber being connected to a new terminal for the receipt of future originating and terminating calls in accordance with the teachings of the present invention.

FIG. 7 is a signal-sequence diagram illustrating a cellular user connecting to a new terminal for both originating and terminating calls in accordance with the teachings of the present invention. As described previously in FIG. 6, when user B wishes to update his information, the featurerequest signal 155 is transmitted from the terminal 1 145 toward his servicing MSC/HLR. The VLR 150 locates the corresponding HLR 200 and relays the featurerequest signal 155. The featurecode variable 156 within the featurerequest signal 155 notifies the HLR 200 that user B wishes to register for both terminating and originating calls. The connect-originating-user signal 175 with the UserID and TermID variables is sent toward the terminal-1-register 220. The terminal-1-register updates the default-user-variable 221 to reflect user B as the default user and the originating-user-variable 222 to also reflect user B as the originating user. The owner-variable 223 needs not be changed because the physical terminal 1 still belongs to user A, and user B is only registering temporarily to use the terminal. After the update: all originating calls by user B on terminal 1 will be charged to the user B's subscription account.

After the completion of the above updating, the terminal-1-register 220 acknowledges the updating of the originating-user-variable by returning the connect-origin-user-ack-signal 180. As a result, the terminal-1-register 220b contains user B as the default and originating user. The HLR 200 sends the update-profile-signal 160 to update the data to the VLR 150 registers. When the update-profile-ack-signal is returned to the HLR 200, the final feature-request-ack-signal 170 is returned to the VLR 150 and terminal 1 to acknowledge the completion of the initial request. Accordingly, user B can now make originating calls as well as receive incoming calls at terminal 1 in accordance with the teachings of the present invention. Furthermore, when user B is originating calls from terminal 1, the user may utilize his subscriber feature services and profiles such as speed dialing codes.

Figure 8:
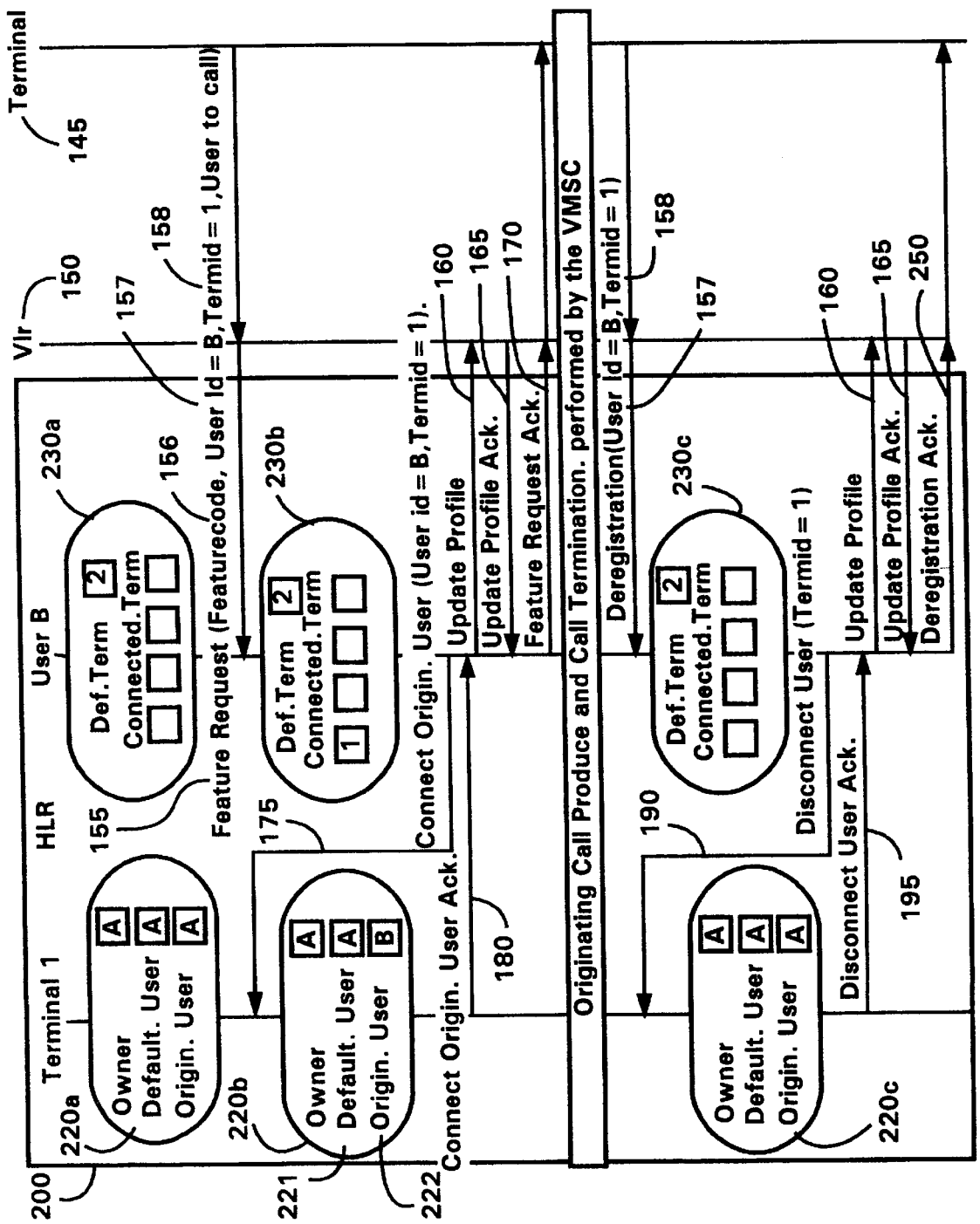
FIG. 8 is a signal-sequence diagram illustrating a cellular subscriber being connected to a new terminal as an originating caller for a single outgoing call in accordance with the teachings of the present invention.

FIG. 8 is a signal-sequence diagram illustrating a cellular user connecting to a new terminal as the originating caller for just one call in accordance with the teachings of the present invention. Even if user B wishes to become the originating caller for just one call on terminal 1, the terminal-1-register 220 within the HLR 200 needs to be updated to reflect user B as the default and originating user. After the call has been completed, the terminal-1-register 220 needs to be restored back to the original value to de-assign user B from the terminal 1 as the original user.

As previously described in FIG. 7, the featurerequest-signal 155 with the appropriate value stored in the featurecode-parameter 156 is received by the HLR 200. The user-B-register within the HLR 200 updates the connected-terminal-variable to include terminal 1 as one of the terminals the user is currently connected to and also sends the connect-originating-user-signal 175 to update the terminal-1-register 220 within the same HLR 200. The terminal-1-register 220b updates the originating-user-variable 222 to reflect user B as the originating user. After updating the terminal-1-register 220, the connect-originating-user-ack-signal 180 is returned to the user-B-register 230. As described previously, the HLR 200 then copies the user information to the registers of the VLR 150 and finally acknowledges the completion of the initial request by sending the featurerequest-ack-signal 170. Now user B is allowed to make an originating call from terminal 1 and have it charged to his default subscription. After the desired call has been completed, terminal 1 now initiates another signaling sequence to deregister user B from the terminal-1-register 220 as the originating user. The deregistration-signal 185 with the userid-variable 157 and the termid-variable 158 is sent to the HLR 200. The HLR 200 removes terminal 1 from the user-B-register 230 as one of the connected terminals and also sends the disconnect-user-signal 190 toward the terminal-1-register 220. The terminal-1-register 220 removes user B as the default user and originating user from its variables and restores their original value by copying it from the default-owner-variable register. After the restoration, the disconnect-user-ack-signal 195 is returned to the user-B-register 230. The HLR 200 once again updates the VLR of user B's information and, lastly, acknowledges the completion of the initial de-registration request by sending the deregistration-ack-signal 250. This ensures user B that only his one time originating call was charged to his subscription and all other subsequent calls originating from that terminal will be charged to the previous owner of the terminal.

Figure 9:
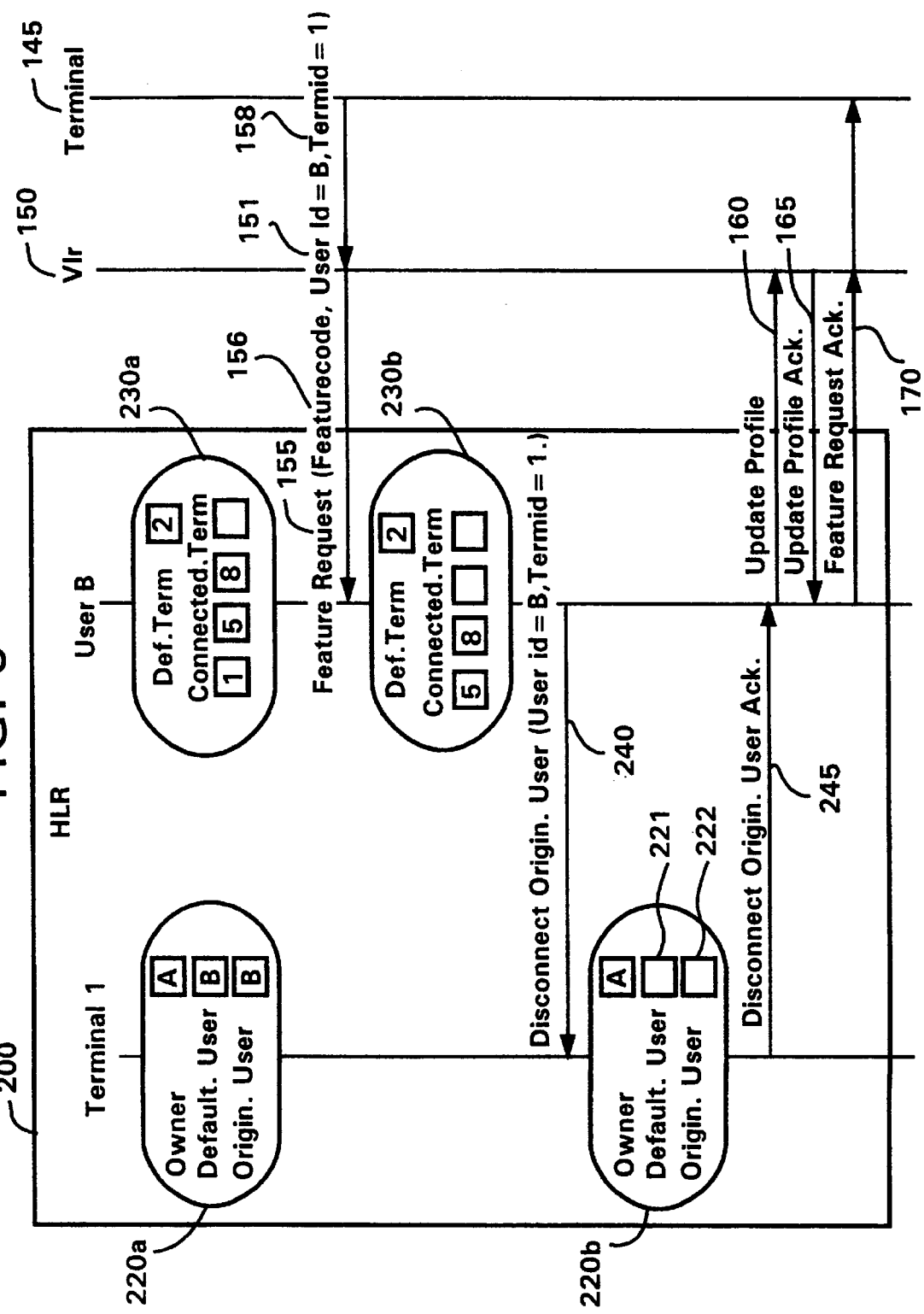
FIG. 9 is a signal-sequence diagram illustrating a cellular subscriber being disconnected from a terminal as the originating user in accordance with the teachings of the present invention.

FIG. 9 is a signal-sequence diagram illustrating a cellular user disconnecting from a terminal as the originating user in accordance with the teachings of the present invention. If user-B registers with terminal-1 145 as the originating user according to the signal sequence described in FIG. 7, and subsequently wants to deregister himself from terminal-1 145 in order to bar all future originating calls from being charged against his subscription, terminal-1 145 sends the featurerequest signal 155 with the appropriate featurecode to request the HLR 200 to deregister user B from the terminal-1-register 220. Upon receipt, the HLR 200 removes terminal-1 145 as one of its connected terminals as shown in the user-B-register 230*b*. The HLR 200 further sends the disconnect-origin-user-signal 240 to the terminal-1-register 220*a* to deregister user B. As shown in the terminal-1-register 220*b*, the values stored in the default-user-variable 221 and the originating-user-variable 222 are accordingly deleted. The acknowledgment disconnect-originating-user-ack-signal 245 is returned to the user-B-register 230. The HLR 200 again updates the VLR 150 with the changed user B information and lastly returns the feature-request-ack-signal 170 to acknowledge the completion of the initial de-registration request. If the owner or any other users wish to use the terminal again, a new registration as originating user is required.

Figure 10:
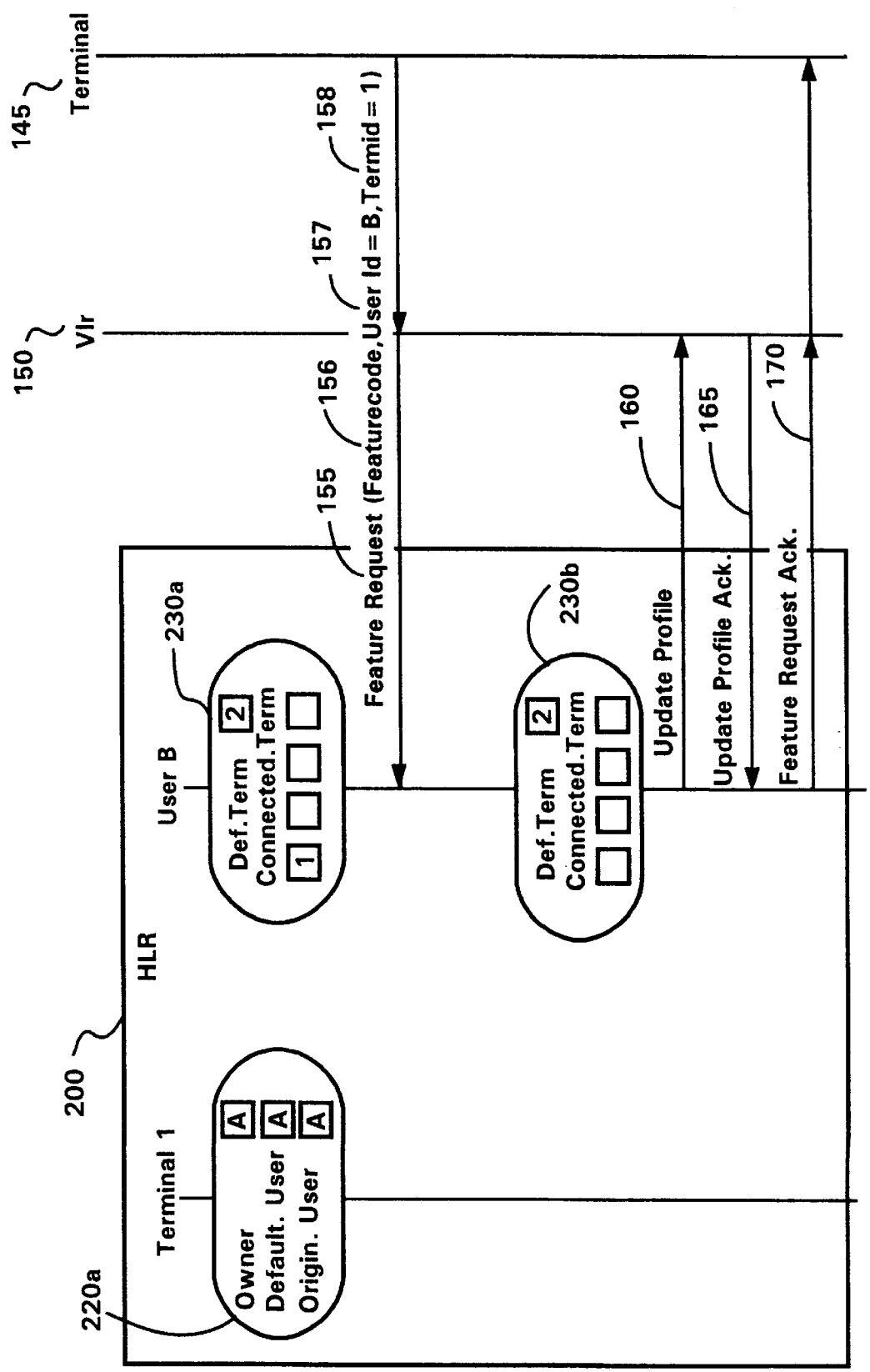
FIG. 10 is a signal-sequence diagram illustrating a cellular subscriber being disconnected from a terminal as a terminating user in accordance with the teachings of the present invention.

FIG. 10 is a signal-sequence diagram illustrating a cellular user disconnecting from a terminal as a terminating user in accordance with the teachings of the present invention. If user-B registers with terminal 1 to enable all future incoming calls to terminate on terminal 1 according to the signal-sequence described in FIG. 6, and subsequently wants to deregister himself from terminal 1 to prevent further termination at that terminal, the featurerequest-signal 155 with the appropriate value stored in the featurecode parameter 156 is sent to the HLR 200. As shown in the user-B-register 230*a* before the receipt of the featurerequest-signal, terminal 1 is currently registered as one of the connected terminals. After the receipt of the signal, as shown in the user-B-register 230*b*, the value 1, reflecting terminal 1 is removed from the connected-terminal-variable. The HLR 200 updates the VLR 150 of the changes in the user information and receives an acknowledgment from the VLR of this update. Lastly, the HLR sends the featurerequest-ack-signal 170 to acknowledge the completion of the initial de-registration request back to the VLR 150.

Figure 11:
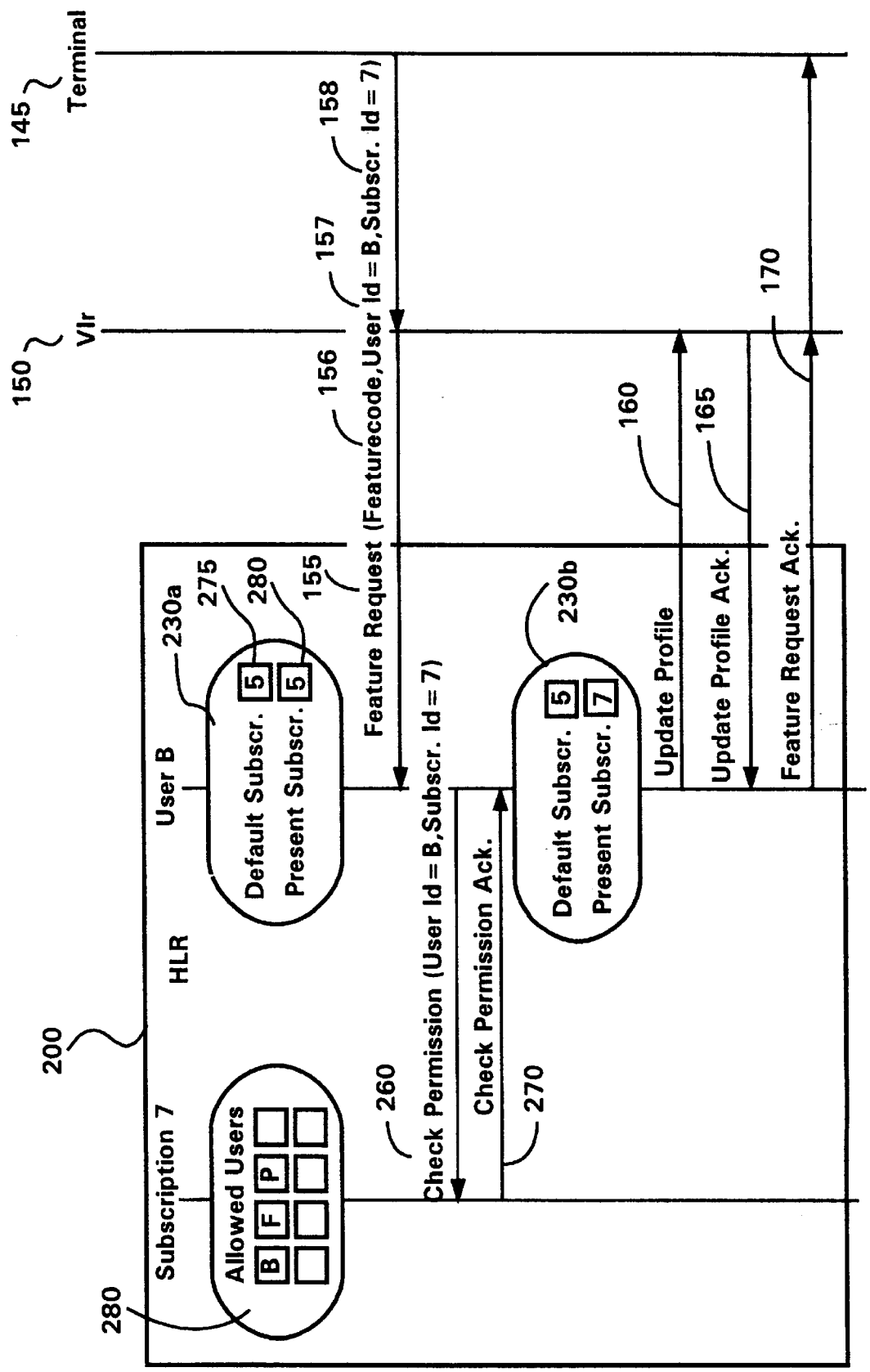
FIG. 11 is a signal-sequence diagram illustrating a cellular subscriber being connected to a new subscription for all future calls in accordance with the teachings of the present invention.

FIG. 11 is a signal-sequence diagram illustrating a cellular user connecting to a new subscription in accordance with the teachings of the present invention. According to the system of the present invention, a user may retain multiple subscriptions and an option to choose any one of those subscriptions while making an individual call. Accordingly, the user-B-register 230 within the HLR 200 further comprises default-subscription and present-subscription-variables. The default-subscription-variable 275 represents the default subscription for user B. The present-subscription-variable 280 represents the identification of a subscription the user is currently charging to. Accordingly, the user-B-record 230*a* illustrates that subscription number 5 is being charged for all fees incurred by user B. When user B wishes to charge his incurred fees against a different subscription, the featurerequest signal 155 with the appropriate value stored in the featurecode parameter is sent to the HLR 200. The SubscrId parameter number within the same signal also contains the value of the identification number of the new subscription. Upon receipt, the HLR 200 sends the checkpermission signal 260 toward the subscription-record 280 storing subscription 7 information to check whether or not user B even has permission to charge to this particular subscription. Upon checking that user B is registered with the subscription-record 280, the checkpermission-ack-signal 270 is returned to the user-B-register 230*a* to inform it of the permission. The user-B-register 230*b* changes the value of its present-subscriber-variable 280 to reflect subscription 7 as the current billing subscription. Once again, the HLR 200 updates the VLR 150 with the latest user information, and upon receipt of the acknowledgment of such updating, the featurerequest-ack-signal 170 is lastly sent to acknowledge the completion of the initial subscription change request. Consequently, all charges incurred by user B are now charged against subscription As an exemplary illustration, subscription 5 may be for user B's personal usage and subscription 7 may be for user B's business usage. Once user B enters his office, user B, by utilizing the above described signal sequence, registers subscription 7 as his current subscription. All calls received and originated from terminal 1 from thereon are charged against his employer or business. Upon leaving work for home, user B may deregister from subscription 7, thereby defaulting to his original subscription, and all charges incurred thereafter will be charged against his personal subscription. According to the present invention, the above described flexibility is made possible even without user B ever changing his cellular telephone terminal.

Figure 12:
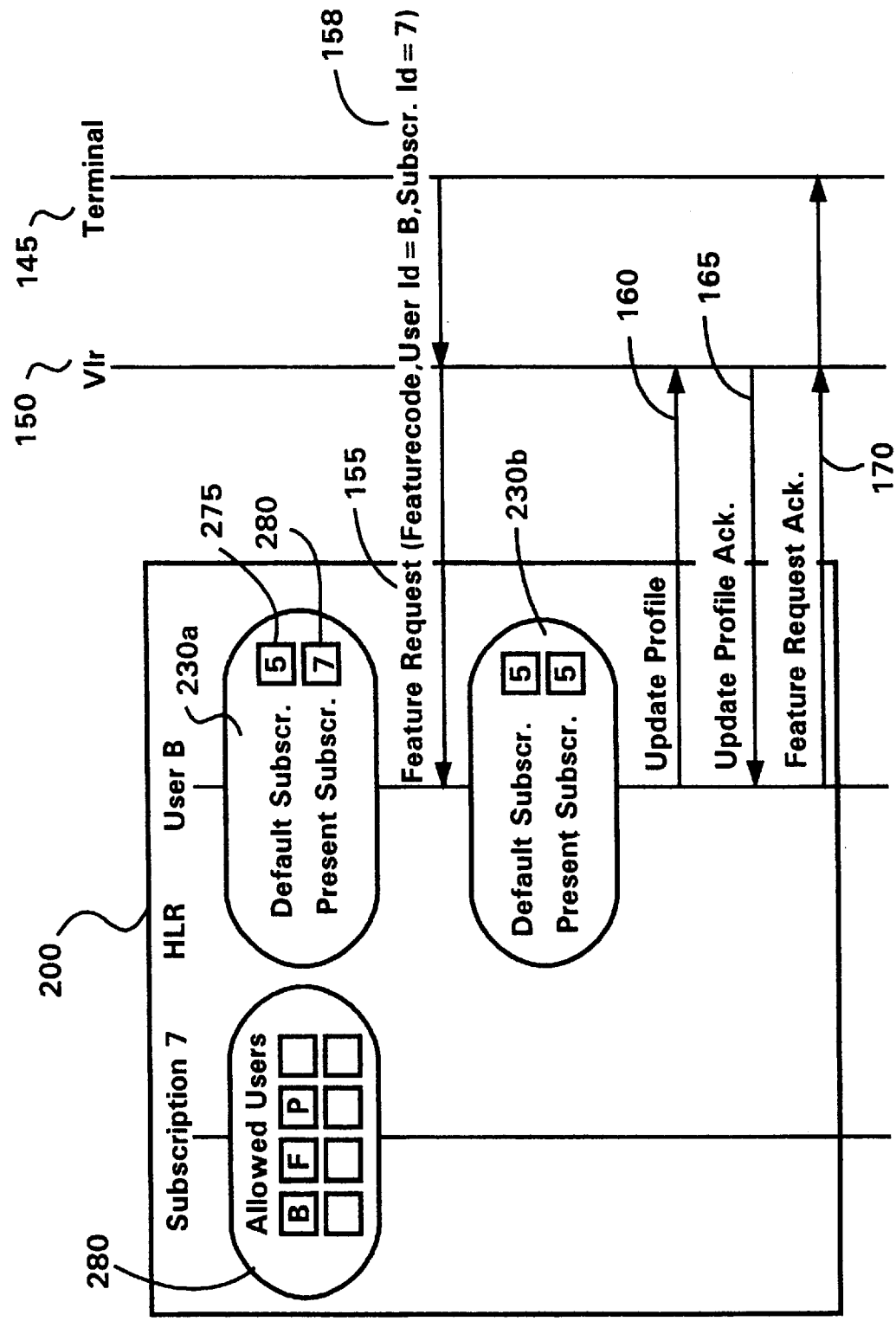
FIG. 12 is a signal-sequence diagram illustrating a cellular subscriber being disconnected from an already assigned subscription in accordance with the teachings of the present invention.

Accordingly, FIG. 12 is a signal-sequence diagram illustrating a cellular user disconnecting from a previously assigned subscription in accordance with the teachings of the present invention. As previously described in FIG. 11, if user B wishes to deregister or disconnect from a temporarily registered subscription, the featurerequest signal 155 is once again sent from the terminal 145 via the VLR 150. The subscrid-variable within the featurerequest-signal 155 once again contains the identification number of the subscription from which the user is to be disconnected. Upon receipt of this signal, the user-B-register 230*a* restores the value contained in its default-subscriber-variable 275 into the present-subscriber-variable 280 erasing the designation of subscription 7 as the current billing subscription as shown in the user-B-register 230*b*. There is no need to check with the subscription-record 280 because the user is not asking for access permission, but rather deregistering himself from association with the subscription. The HLR 200 again updates the VLR 150 with the latest updated user information, and sends the featurerequest-ack-signal 170 to acknowledge the completion of the initial subscription de-registration request.

Figure 13:
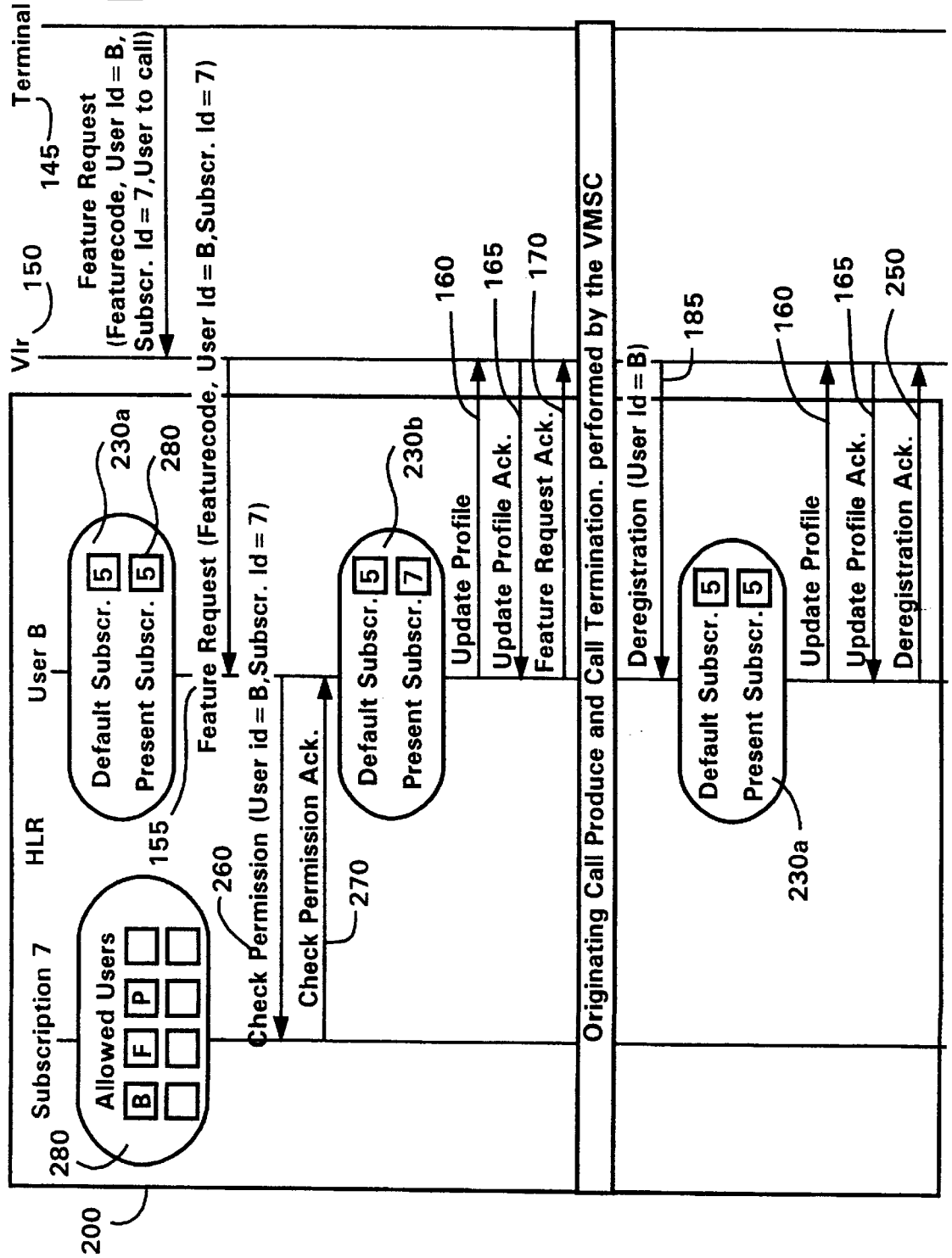
FIG. 13 is a signal-sequence diagram illustrating a cellular subscriber being connected to a new subscription for a single call in accordance with the teachings of the present invention.

FIG. 13 is a signal-sequence diagram illustrating a cellular user connecting to a new subscription for just one call in accordance with the teachings of the present invention. If a user wishes to make just one call and have it charged to a different subscription than the one he is currently registered to, a temporary registration has to be executed in order to update the user-B-register 230*a* with the new subscription number. After the completion of the call, de-registration has to be executed in order to restore the previous value of the present-subscription variable 280.

Accordingly, the terminal 1 145 sends the featurerequest signal 155 via the VLR 150 with the appropriate value in the featurecode variable. Upon receipt, the HLR 200 asks permission from the subscription-record by sending the checkpermission-signal 260 with the user ID. The subscription record 280 checks to see if the requesting user is one of its allowed users and returns the check-permission-ack-signal 270 accordingly. The user-register 230b updates its present-subscription-variable 155 to reflect subscription 7 as the current billing subscription. The HLR 200, once again, updates the VLR 150 of the latest updated user information by the update-profile-signal 160. Upon receipt of the update-profile-ack-signal 165 back from the VLR 150, the HLR 200 sends the featurerequest-ack-signal 170 back to the VLR 150 to acknowledge the completion of the initial subscription registration request. Once the call has been completed and terminated, the deregistration-signal 185 is sent to the HLR 200. The user-B-register 230a restores the value of the present-subscription-variable to its previous value. The HLR 200 again updates the VLR 150 to inform the latest updated user information and the deregistration-ack-signal 250 is returned to the VLR 150 to acknowledge the completion of the initial deregulation request.

Summarily, according to the teachings of the present invention, the concept of a cellular "subscriber" is divided into three different and separate concepts of subscription, user and terminal. By such division, allowing separate registers or storage means of each of the three concepts or elements, it is possible to connect:

several terminals to one user;
several users to one terminal;
several subscriptions to one user; and
several users to one subscription.

Although a preferred embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

What is claimed is:

1. A cellular telecommunications system for enabling a user from a plurality of users to access at least one of plurality of terminals and to allocate fees to at least one of a plurality of subscriptions, said cellar telecommunications system comprising:

a feature request signal having a plurality of parameters generated by the user for configuring the at least one terminal, said plurality of parameters include a feature code for indicating one of a plurality of transaction tupes, a UserID parameter for identifying the user, a TermID parameter for indicating the at least one of the plurality of terminals used by the user, and a SubscrID parameter for indicating as identification number of a new subscription;

a location register for receiving the feature request signal;

a plurality of user memory storage coupled to the location register and corresponding one-to-one with the plurality of users, each register for storing terminal variables and subscription variables;

a plurality of subscription memory storage coupled to the location register and corresponding one-to-one with the plurality of subscriptions, each subscription register for storing an allowed user variable;

a plurality of terminals memory storage coupled to the location register and corresponding one-to-one with the plurality of terminal, each terminal register for storing user variables; and means for updating un accordance to the received feature request signal at least one of the plurality of user memory storage, subscription memory storage, and terminal memory storage.

2. The cellular telecommunications system of claim 1, wherein the location register includes a visitor location register.

3. The cellular telecommunications system of claim 1, further includes at least one home location register for containing the plurality of user memory storage, subscription memory storage, and terminal memory storage.

4. The cellular telecommunications system of claim 1, wherein the terminal variables of each user memory storage includes:

a default terminal variable for identifying one of the plurality of terminals as a default terminal; and a connected terminal variable for identifying at least one of the plurality of terminals as a connected terminal.

5. The cellular telecommunications system of claim 1, wherein the subscription variables of each user memory storage includes:

a default-subscription-variable for indicating one of the plurality of subscriptions as a default subscription; and a present-subscription-variable for indicating one of the plurality of subscriptions as a current subscription.

6. The cellular telecommunications system of claim 1, wherein the user variables of each terminal memory storage includes:

an owner variable for identifying one of the plurality of users as an owner;

a default-user variable for identifying one of the plurality of users as a default user; and an originating-user variable for identifying one of the plurality of users as an originating user.

7. A method within a cellular telecommunications system for enabling a user from a plurality of users to access at least one of a plurality of terminals and to allocate fees to at least one of a plurality of subscriptions, said method comprising the steps of:

generating a feature request signal having a plurality of parameters for configuring the at least one terminal, said plurality of parameters include a feature code for indicating one of a plurality of transaction types, a UserID parameter for identifying the user, a TermID parameter for indicating the at least one of the plurality of terminals used by the user, and a SubscrID parameter for indicating an identification number of a new subscription;

receiving the feature request signal at location register;

storing terminal variables and subscription variables within each one of a plurality of user memory storage corresponding one-to-one with the plurality of users;

storing an allowed user variable within each one of a plurality of subscription memory storage corresponding one-to-one with the plurality of subscriptions;

storing user variables within each one of a plurality of terminal memory storage corresponding one-to-one with the plurality of terminals; and updating in accordance to the received feature request signal at least one of the plurality of user memory storage, subscription memory storage, and terminal memory storage.

8. The method of claim 7, further comprising the step of completing one of a plurality of transaction types in accordance with said feature code of the feature request signal.

9. The method of claim 30, further comprising the step of containing the plurality of user memory storage, subscription memory storage, and terminal memory storage within at least one home location register.

* * * * *

UNITED STATES PATENT AND TRADEMARK OFFICE
CERTIFICATE OF CORRECTION

PATENT NO. : 6,253,074 B1
DATED : June 26, 2001
INVENTOR(S) : Carlsson et al.

Page 1 of 1

It is certified that error appears in the above-identified patent and that said Letters Patent is hereby corrected as shown below:

Column 11,
Line 52, replace "cellar" with -- cellular --
Line 59, replace "tupes" with -- tapes --
Line 62, replace "as" with -- an --

Column 12,
Line 1, insert -- user -- between "each" and "register"
Line 7, replace "terminals" with -- terminal --
Line 9, replace "terminal" with -- terminals --
Line 11, replace "un" with -- in --

Signed and Sealed this

Ninth Day of April, 2002

Attest:

Attesting Officer

JAMES E. ROGAN
Director of the United States Patent and Trademark Office